J. P. WOODBURY.
Freight Car.
No. 94,461.
Patented Aug. 31, 1869.
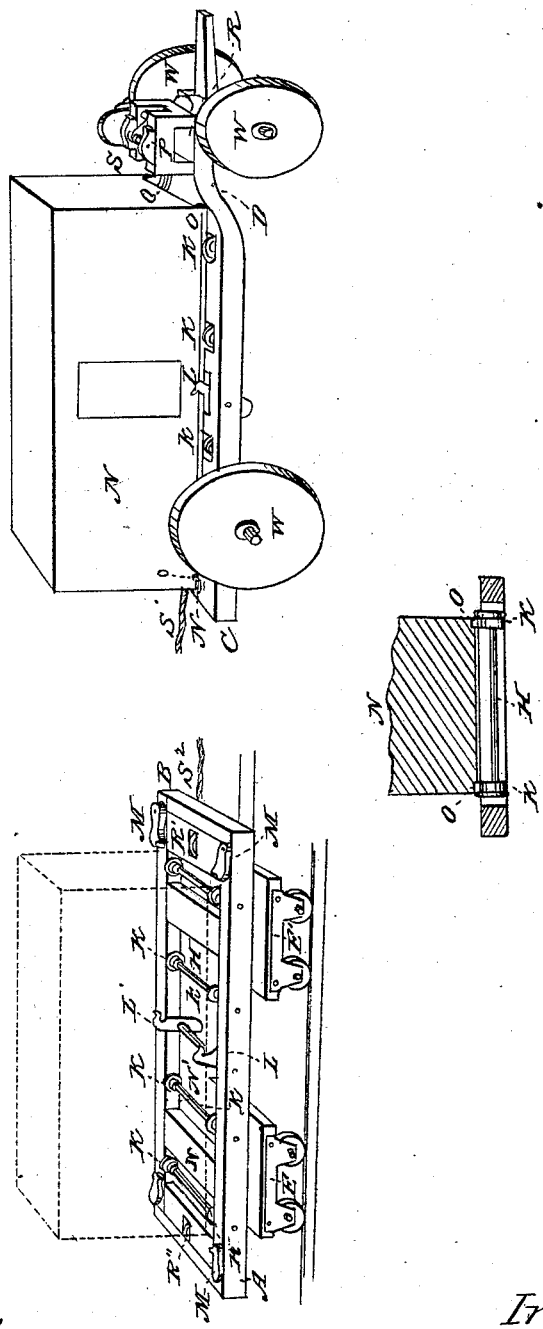
Witnesses:
Frank W. Parker.
William Edson
Inventor:
Joseph P. Woodbury

United States Patent Office.

JOSEPH PAGE WOODBURY, OF BOSTON, MASSACHUSETTS.

Letters Patent No. 94,461, dated August 31, 1869.

IMPROVEMENT IN RAILWAY FREIGHT-CARS.

The Schedule referred to in these Letters Patent and making part of the same.

*To all whom it may concern:*

Be it known that I, JOSEPH PAGE WOODBURY, of Boston, in the county of Suffolk, and State of Massachusetts, have invented a certain new and useful improved System of Freight Transportation; and I do hereby declare that the following is a full and exact description thereof, reference being had to the accompanying drawings, and to the letters of reference marked thereon.

The nature of my invention consists in arranging a freight-cab, which is provided with base-rails or wheel-ways, in connection with a platform railroad-car and a street-dray, the whole being so constructed and arranged that the cab may be readily transferred from the one to the other on flanged wheels.

To enable others skilled in the art to make and use my invention, I will proceed to describe its construction and use.

Drawings.

Figure 1 represents, in perspective, a platform railroad-car, the outline of the freight-cab being indicated by dotted lines.

Figure 2 represents, in perspective, a street-dray, with a freight-cab on it.

Figure 3 is a cross-section, showing parts of the platform-car and freight-cab.

Construction.

A B, fig. 1, represents a strong frame, made substantially as shown, or in any suitable manner, and supported by ordinary railroad-trucks E E', these trucks being connected to the frame A B by any of the approved methods.

This frame A B is provided with series of axles H H' H", &c., arranged so as to revolve freely in the frame, and have at each end a flanged wheel, K, upon which the wheel-ways O O, figs. 2 and 3, of the freight-cab, rest.

M M, &c., are buttons or dogs, attached to the platform of the car, and also to the dray, and serve, in connection with the hooks L and L', to hold the cab firmly in position.

The street-dray, fig. 2, is provided with wheels K K, &c., arranged to operate substantially as those of the car already described, and serves for the same purpose.

The end of the dray, fig. 2, is provided with a windlass, P, of any approved construction. The one represented in the drawings is fully described in Henry F. Shaw's Letters Patent, dated May 21, 1867.

Each dray and platform-car is provided with suitable sheaves R, over which traction-ropes may pass, by means of which the loaded cab is transferred from the car to the dray, and *vice versa*.

The freight-cab N is provided with base-rails or wheel-ways O O, figs. 2 and 3, which rest upon the flanged wheels K K, &c.

This cab is made of convenient size and style, to suit the merchandise to be transported, and designed to fit the car or dray equally well, so that it may be used on one or the other.

Instead of one large cab, two or even more smaller ones may be placed upon the same platform for convenience in transporting certain classes of freight.

If desirable, the cab can be made as wide as the whole space between the wheels, in which case the wheel-ways O O would not be on the outer edges of the cab, but be located so as to accommodate the flanged wheels K K, &c.

If more convenient, the wheel-ways on the under side of the cab, and the flanged wheels K K, &c., may be set transversely to the cab, so that it may be loaded and unloaded to and from the side of the car or dray, in which case the dray-wheels would have to be smaller in diameter than those represented in the drawings.

In the drawing, S represents a rope, connected to the windlass, which may be passed around the sheave R, and connected to the eye-bolt Q of the cab N, fig. 2, for the purpose of drawing it on.

To draw the cab N off from the dray on to the platform of the car, the rope S from the windlass, as shown at $S^1$ $S^2$, is passed around the sheave $R^2$, then back to an eye-bolt made in the rear of the cab N, then, by turning the windlass P, the cab will be drawn on to the car.

My invention may be used as follows:

The dray with the freight-cab N may be loaded at the manufactory or place of supply, and thence taken by horses to the railroad-station, at which place the freight-cab N is hauled off directly from the dray, by means of ropes and windlass, on to the platform-car A B, fig. 1, to which it is made secure.

It is then transported on the railroad to the delivery-depot, at which place it is reloaded on to a dray, similar to the one represented in fig. 2, and carried to the place or places of destination.

By my system of transportation, the goods transported need not be handled at all by the freight-hands, the freight-cab being locked by the merchant shipping the goods, to be unlocked only by the receiver.

What I claim as my invention, and desire to secure by Letters Patent, is—

1. The cab N, when used in connection with the car A B and dray C D, for the transportation of freight, substantially as set forth.

2. The flanged wheels K K, &c., in connection with the car platform, substantially as described and for the purpose set forth.

3. The flanged wheels K K, &c., in connection with the dray platform, substantially as described and for the purpose set forth.

4. The combination of the windlass P and its rope with the sheave R, for the purpose of drawing the cab on to the dray, substantially as set forth.

5. The combination of the windlass P with the sheave $R^2$, for the purpose of drawing the cab from the dray to the car, substantially as set forth.

6. The combination of the dogs M M M, &c., or their mechanical equivalents, with the platform of the dray or car, substantially as described and for the purpose set forth.

7. The combination of the hooks L L', or their mechanical equivalents, with the platform, substantially as described and for the purpose set forth.

JOSEPH PAGE WOODBURY.

Witnesses:
WILLIAM EDSON,
FRANK G. PARKER.